United States Patent

Foster

[11] 4,030,774
[45] June 21, 1977

[54] PEDAL ACTUATED BICYCLE BRAKE WITH COORDINATING SUPPORTING STAND

[76] Inventor: Edwin E. Foster, 1801 Camp Craft Road, Austin, Tex. 78746

[22] Filed: Feb. 6, 1975

[21] Appl. No.: 547,574

[52] U.S. Cl. .............................. 280/261; 188/24; 192/41 R; 280/294
[51] Int. Cl.² ...................... B62M 1/02; B62L 5/10
[58] Field of Search .......... 280/261, 260, 259, 294; 188/24, 27; 192/41 R, 41 A, 41 S, 45, 46

[56] References Cited

UNITED STATES PATENTS

| | | | |
|---|---|---|---|
| 444,258 | 1/1891 | Tillinghast | 280/294 |
| 2,308,926 | 1/1943 | Kreis | 192/46 |
| 3,486,586 | 12/1969 | Grier | 188/24 |
| 3,774,732 | 11/1973 | Basek | 188/24 |
| 3,854,555 | 12/1974 | Quisenberry | 188/24 |
| 3,877,726 | 4/1975 | Foster | 280/294 |
| 3,888,334 | 6/1975 | Mack | 188/24 |

FOREIGN PATENTS OR APPLICATIONS

| | | | |
|---|---|---|---|
| 122,487 | 10/1946 | Australia | 188/24 |
| 768,544 | 8/1934 | France | 188/24 |
| 1,022,084 | 2/1953 | France | 188/24 |
| 1,028,004 | 5/1953 | France | 188/24 |
| 558,211 | 12/1943 | United Kingdom | 188/24 |

*Primary Examiner*—John P. Silverstrim
*Attorney, Agent, or Firm*—Ralph W. Kalish

[57] ABSTRACT

A bicycle having front and rear wheel caliper brakes each being connected by a cable to a linkage including a swingable cam element which is normally disposed in the path of travel of a cooperating cam member mounted for movement concentrically about the pedal axle whereby the cam element through its swingability is removed from such path during forward pedaling action and is lockingly engageable with such cam member upon back pedaling action. In the latter condition force is applied to the linkage for effecting a pull upon the cables to effect braking operation. The cam members are so related to the pedal cranks that when engagement with the cam element is effected one pedal crank will be downwardly directed whereby a support stand carried upon the associated pedal may cause such pedal to swing to present the support stand for engagement with the support surface.

24 Claims, 36 Drawing Figures

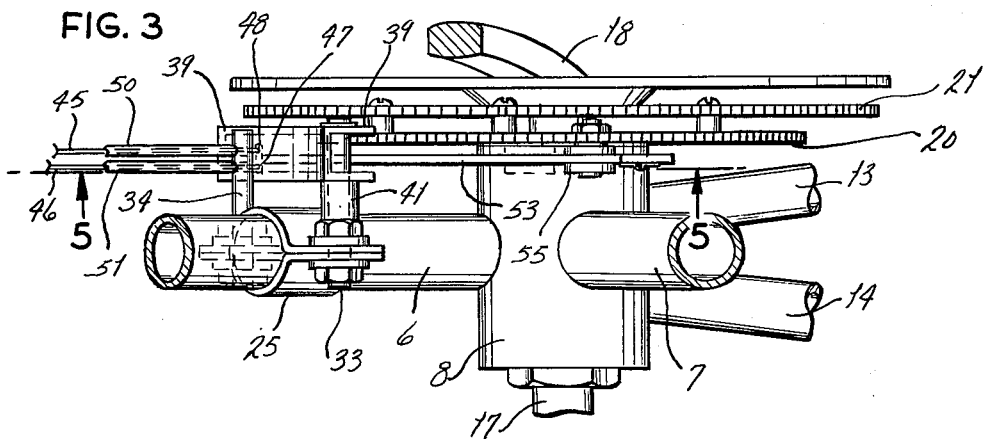
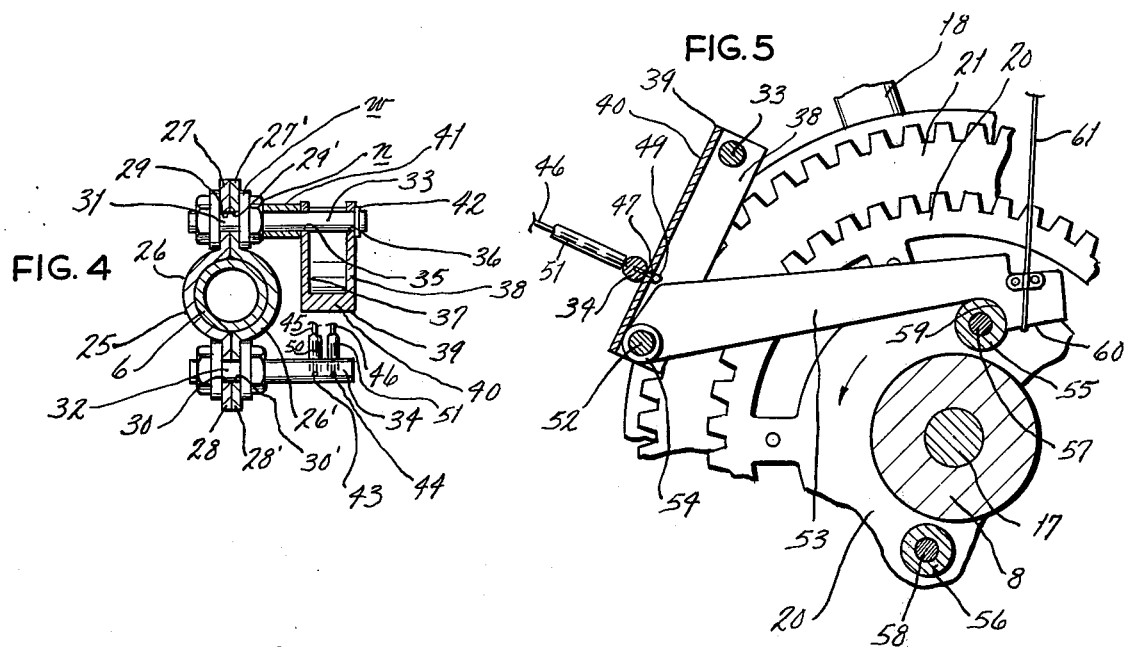
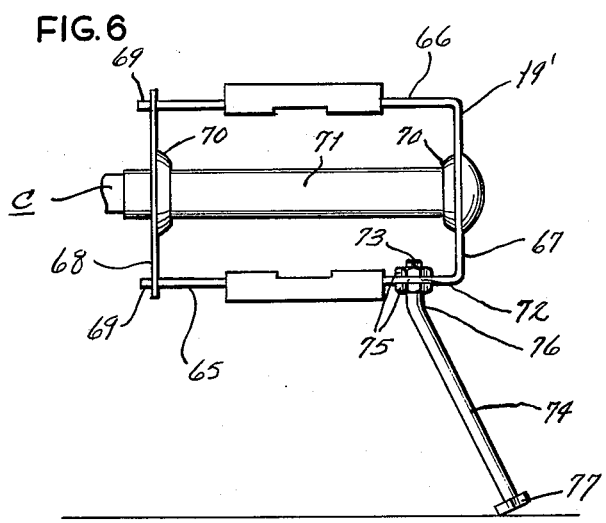

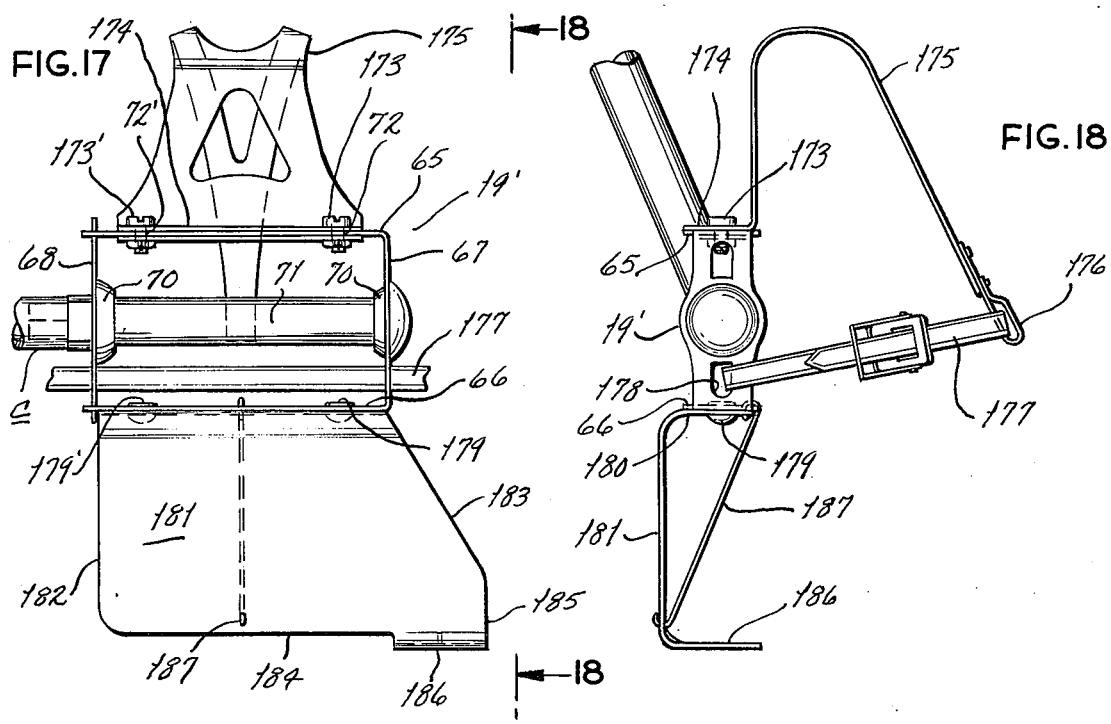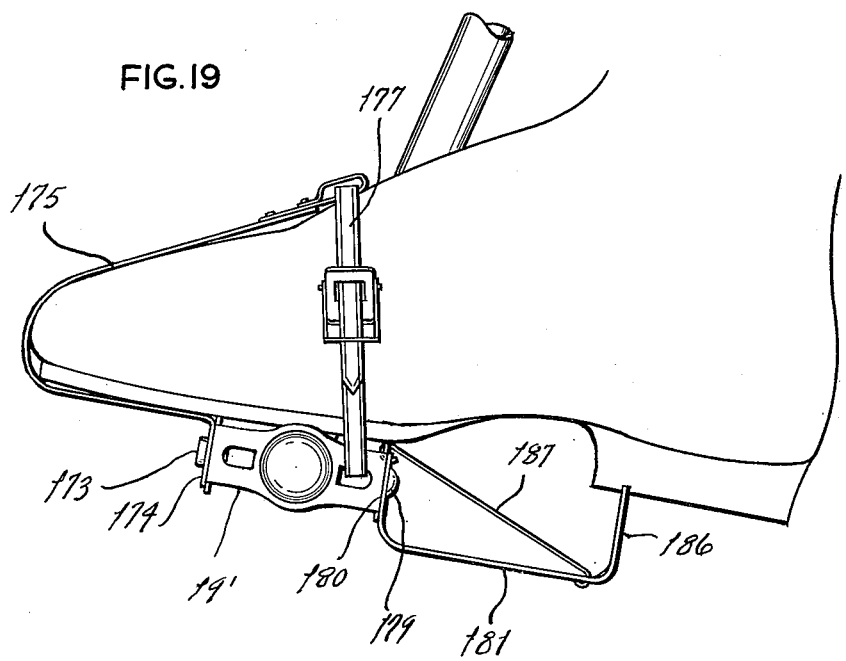

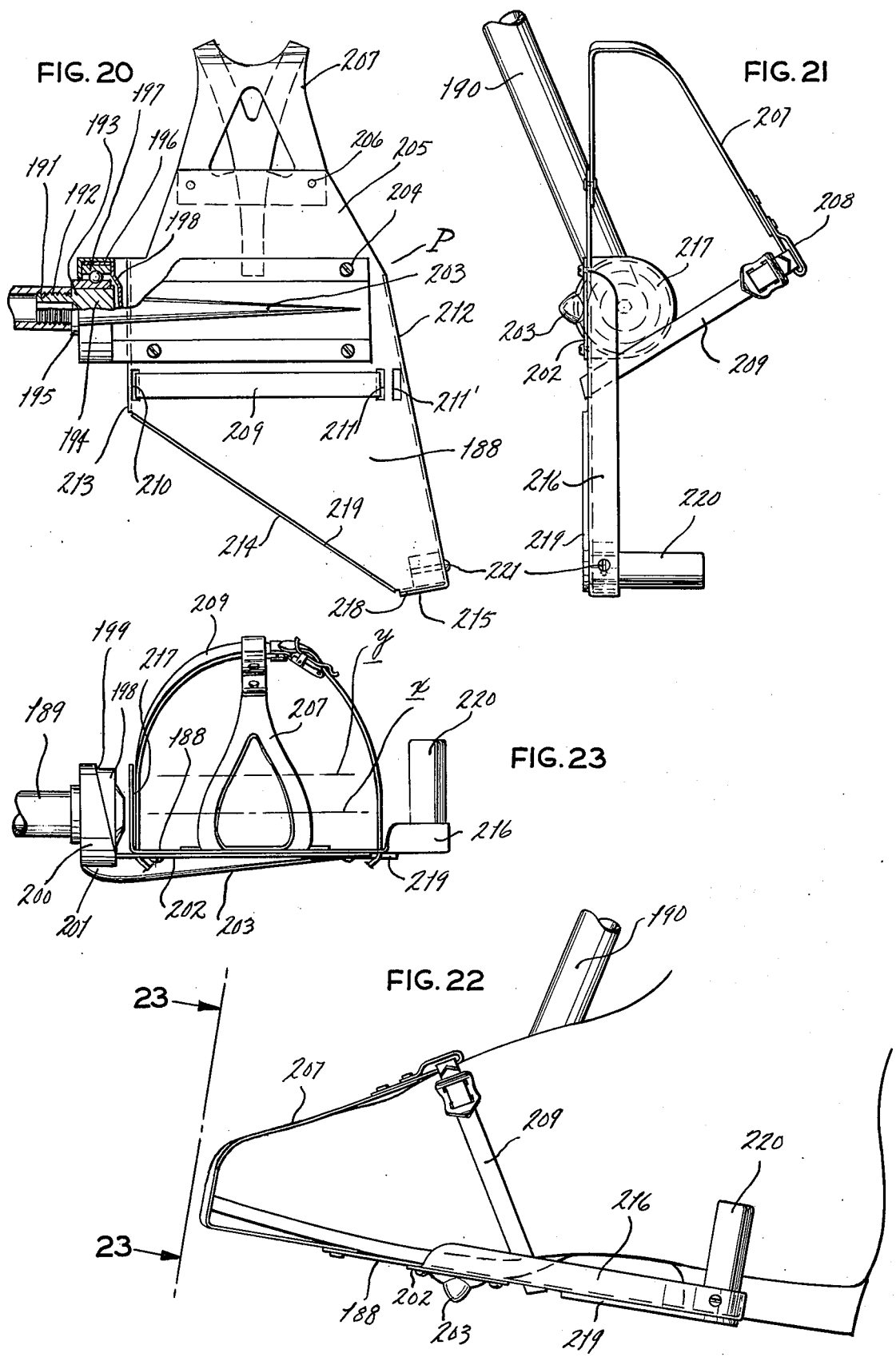

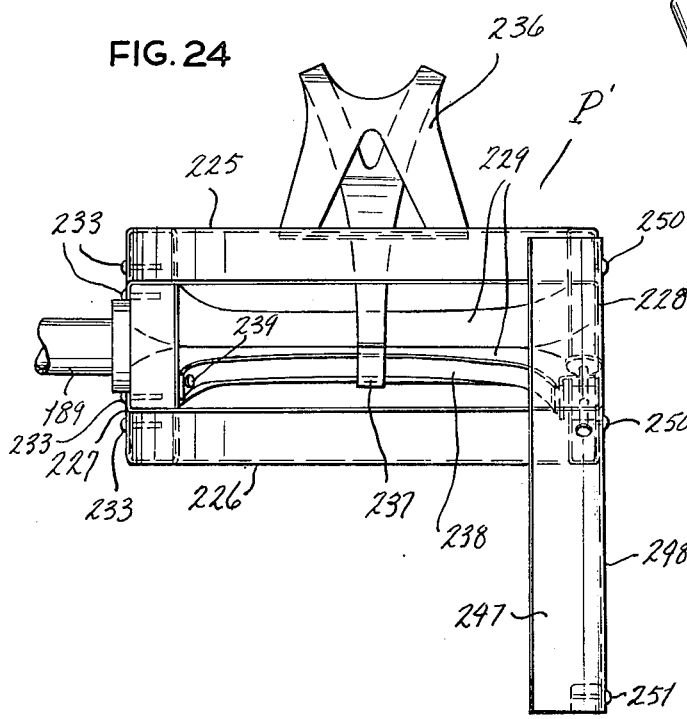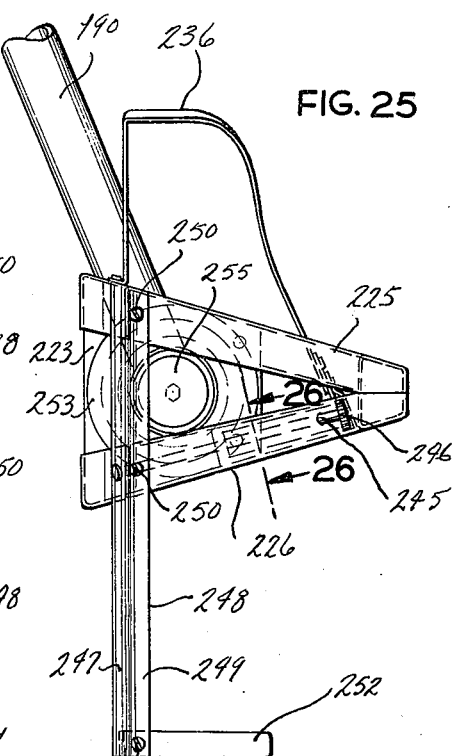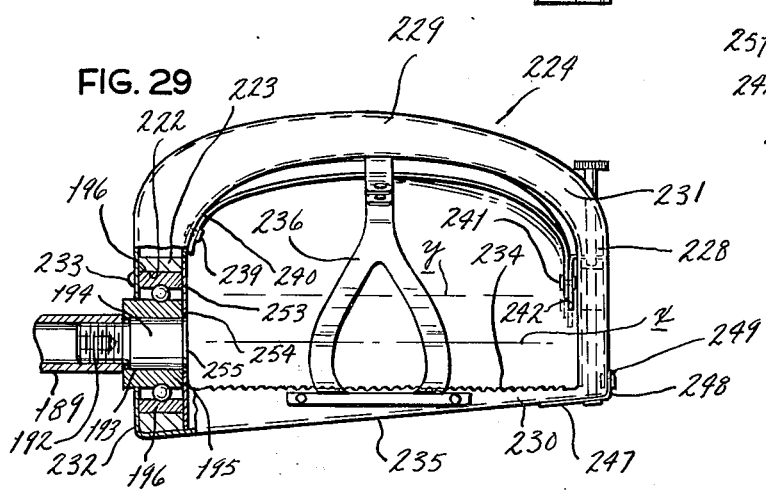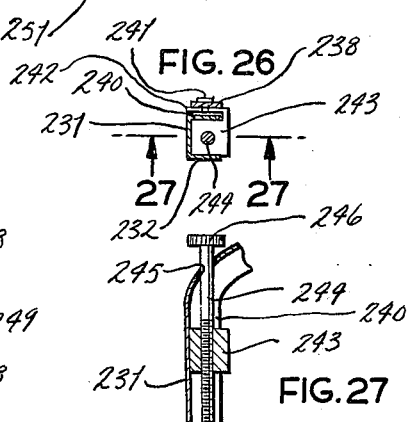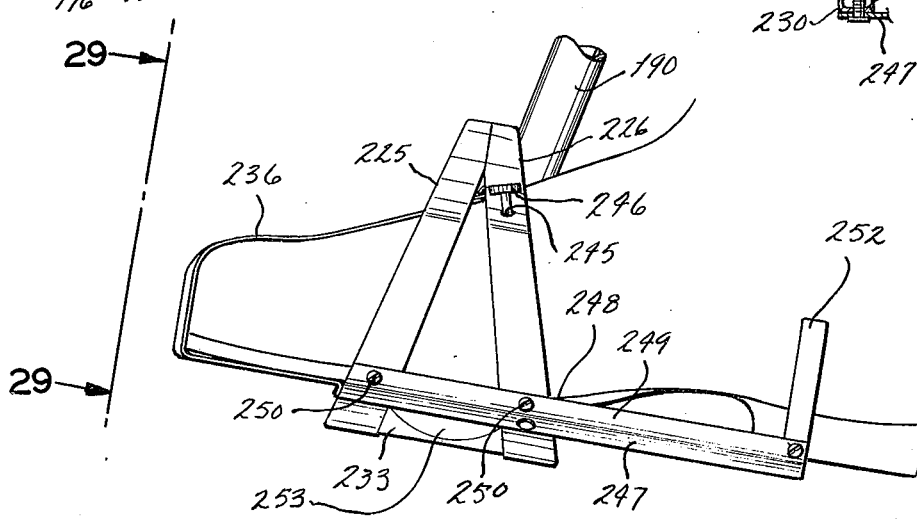

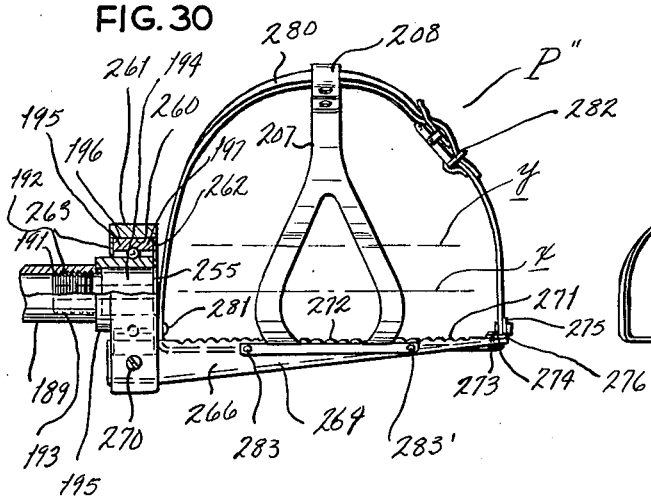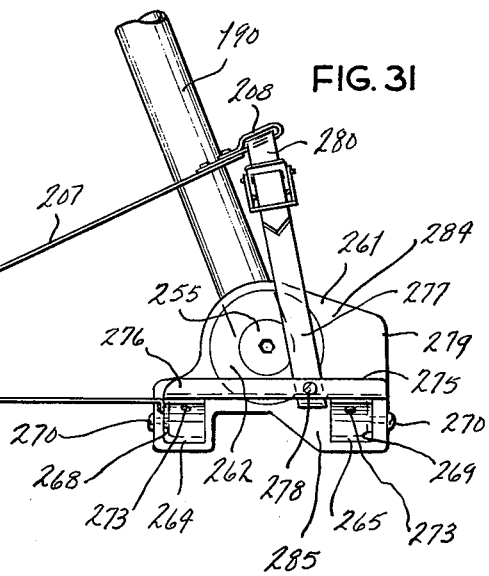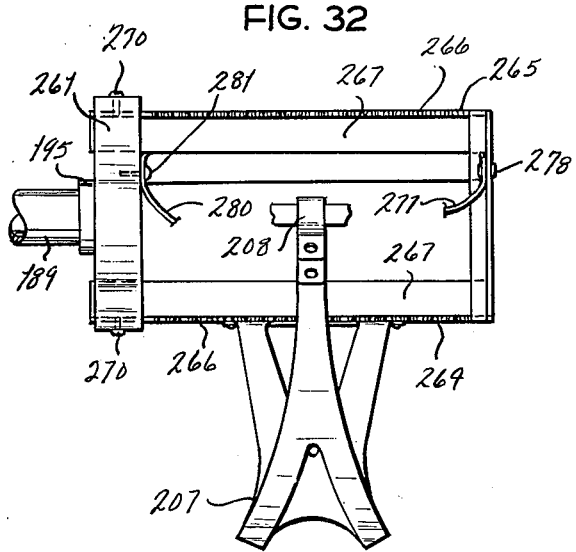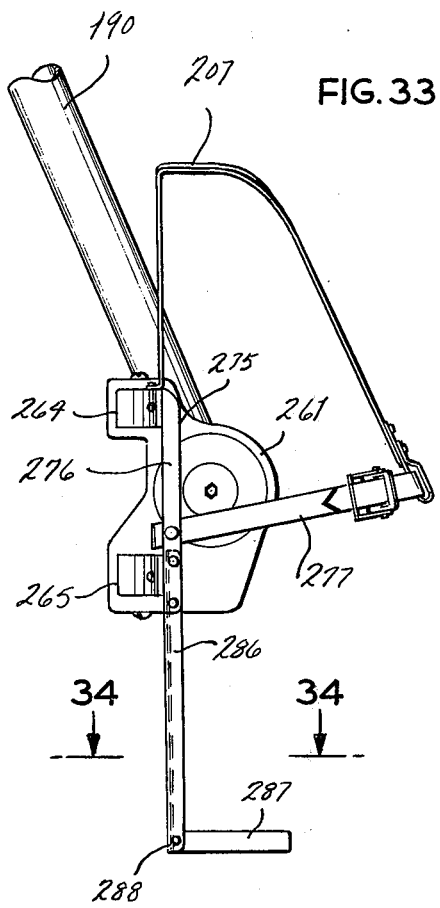

PEDAL ACTUATED BICYCLE BRAKE WITH COORDINATING SUPPORTING STAND

BACKGROUND AND SUMMARY OF THE INVENTION

This invention relates in general to bicycles and, more particularly, to braking systems therefor in association with automatic support stands.

It is an object of the present invention to provide a pedal actuated brake system for bicycles having front and rear wheel caliper brakes.

It is another object of the present invention to provide a pedal actuated brake system for bicycles, the operation of which is coordinated with the pedal crank disposition so that upon braking action, one pedal crank will be directed downwardly for presenting the associated pedal in immediate proximity to the support surface.

It is a further object of the present invention to provide a pedal actuated braking system for bicycles which coordinates with pedal crank operation in order that a pedal carried support stand will be presented automatically in operative position upon removal of the operator's foot contemporaneously with braking action.

It is another object of the present invention to provide a pedal actuated braking system for bicycles having coordinating automatic bicycle support means and wherein such systems may be easily and economically installed upon bicycles as of the type originally provided with handle-controlled brakes.

It is a still further object of the present invention to provide a pedal actuated brake system for bicycles which incorporates novel cooperative components for interengagement upon back pedaling action; which components are durable and, hence, highly wear resistant.

It is another object of the present invention to provide a unique post arrangement for a bicycle to permit of facile movement of the handle bars between racing and touring position.

It is a still further object of the present invention to provide a support stand for mounted disposition upon a pedal, equipped with a toe clip; which is automatically swung into bicycle support position upon removal of the operator's foot and which is especially adapted for current low slung pedals.

It is another object of the present invention to provide a bicycle incorporating a unique pedal construction equipped with the usual toe clip and having support stand means.

It is a further object of the present invention to provide for use with bicycles of the present invention, a pedal equipped with the customary toe clip and having a guide component for facilitating entry of the foot into such pedal from a position of disuse.

It is a still further object of the present invention to provide for use with bicycles of the present invention a pedal equipped with a toe clip and having a counterbalancing component for resisting the torque inherently provided by the toe clip when the pedal is in disuse.

It is another object of the present invention to provide a pedal for use with bicycles wherein the foot-supporting portion is located downwardly of the axis of rotation of the pedal crank arm thereby endowing the pedal with a low, under-slung character and, accordingly, relative depressing the center of gravity of the rider for enhanced comfort as well as increased safety.

It is a further object of the present invention to provide a low, under-slung pedal of the type stated which is useful in lieu of standard pedals and which may be adapted for incorporation with bicycles having pedal actuated brakes.

It is a still further object of the present invention to provide a low, under-slung pedal of the type stated which may be toe clip equipped and yet suitably constructed for balancing so that the pedal will maintain horizontal disposition when is disuse.

It is another object of the present invention to provide an arrangement for facilitating rotation of the handle bars between the racing and touring positions, but without necessitating the use of a locking nut.

BRIEF DESCRIPTION OF THE DRAWINGS

FIG. 3 is a top plan view taken on the line 3—3 of FIG. 2.

FIG. 4 is a vertical transverse sectional view taken on the line 4—4 of FIG. 2.

FIG. 5 is a fragmentary side elevational view, in partial section, taken on the line 5—5 of FIG. 3.

FIG. 6 is a front elevational view taken on the line 6—6 of FIG. 1.

FIG. 17 is a front elevational view of a pedal useful with the bicycles of the present invention and being provided with a toe clip and another form of support stand constructed in accordance with and embodying the present invention; said pedal being illustrated in inoperative condition.

FIG. 18 is a side elevational view of the pedal shown in FIG. 17 as taken from the right hand side of FIG. 17.

FIG. 19 is a side elevational view taken substantially on the right hand side of FIG. 17 but illustrating the associated pedal disposed for cycling action.

FIG. 20 is a front view of a further form of pedal constructed in accordance with and embodying the present invention, and being useful with bicycles of the present invention; said pedal being illustrated in inoperative condition.

FIG. 21 is a side elevational view of the pedal shown in FIG. 20 as taken from the right hand side of FIG. 20.

FIG. 22 is a side elevational view taken substantially on the right hand side of FIG. 20 but illustrating the pedal disposed for cycling action.

FIG. 23 is a front end view taken on the line 23—23 of FIG. 22.

FIG. 24 is a front view of a still further form of toe clipped equipped pedal useful with bicycles of the present invention and being constructed in accordance with and embodying the present invention, illustrating the pedal in inoperative position; said pedal being so-called under-slung character.

FIG. 25 is a side elevational view of the pedal taken on the right hand side of FIG. 24.

FIG. 26 is a horizontal transverse sectional view taken along the line 26—26 of FIG. 25.

FIG. 27 is a vertical transverse sectional view taken on the line 27—27 of FIG. 26.

FIG. 28 is a side elevational view taken substantially on the right hand side of FIG. 24 but illustrating the pedal disposed for cycling action.

FIG. 29 is a front end view taken substantially on the line 29—29 of FIG. 28.

FIG. 30 is a front view, in partial section, of a still further form of pedal constructed in accordance with the present invention and being also of the under-slung character.

FIG. 31 is a side elevational view of the pedal shown in FIG. 30 and taken from the right hand side thereof.

FIG. 32 is a top plan view.

FIG. 33 is a side elevational view illustrating the pedal of FIG. 30 in a position of disuse and as maintained in position by a support stand element.

FIG. 34 is a horizontal transverse sectional view taken on the line 34—34 of FIG. 33.

DESCRIPTION OF THE PRACTICAL EMBODIMENTS

Figure 1:
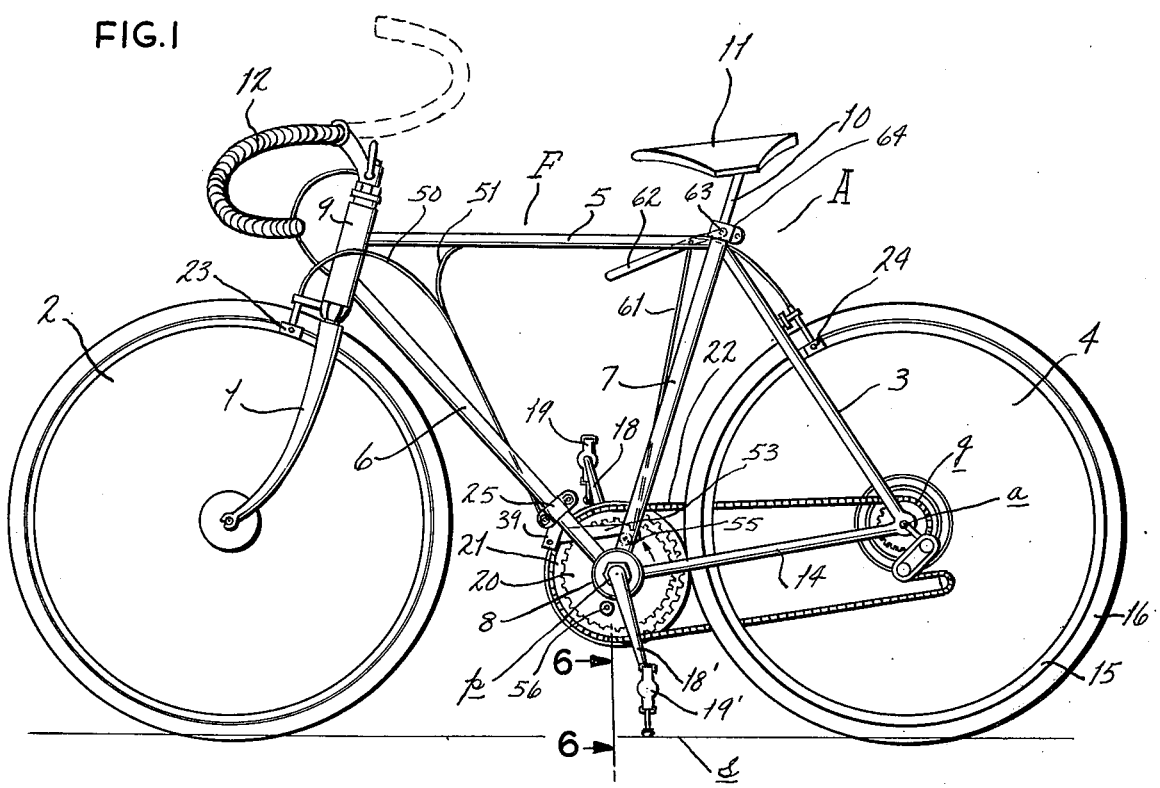
FIG. 1 is a side view of a bicycle having mounted thereon a pedal actuated brake with coordinated support stand constructed in accordance with and embodying the present invention.

Referring now by reference numerals to the drawings which illustrate practical embodiments of the present invention, A generally designates a bicycle including a frame F, having a front fork 1 mounting a front wheel 2, a rear fork 3 mounting a rear wheel 4, with there being a cross bar 5 connecting said forks 1,3. Frame F also incorporates front and rear diagonal bars 6,7, respectively, which at their lower ends merge into the usual hub 8. At its forward, upper end, front diagonal bar 6 is integral with the upper portion or post 9 of front fork 1 while the upper end of rear diagonal bar 7 is unitary with the upper end of fork 3 and the rearward end of cross bar 5; there being the customary extensible rod 10 for accommodating a seat 11. Mounted upon post 9 are handle bars 12. Diverging rearwardly from hub 8 are the usual rear support bars 13,14 for the rearward axle a. Each wheel 2,4, which is of the usual spoke-type, embodies the customary rim 15 for receiving a tire 16. Hub 8 supports a shaft 17 of a pedal crank assembly, generally denoted p. Shaft 17 at each of its ends carries the usual pedal cranks 18,18' which at their lower ends carry foot pedals 19,19', respectively.

Bicycle A is set forth herein as being of the popular ten-speed type and is thus shown as having a pair of inner and outer drive sprockets 20,21, respectively, secured upon hub shaft 17 between hub 8 and pedal crank 18. Provided for selected engagement about drive sprockets 20,21 is the forward end portion of the usual endless transmission or drive chain 22 which is engageable in its rearward end portion about a predetermined drive sprocket of the cluster, customarily five, of driven sprockets, or so-called derailleur gears, indicated generally g, mounted upon bicycle rear axle a in side-by-side relationship. Bicycle A embodies the expected system for interconnecting drive sprocket 20 or 21 with a driven sprocket to provide the desired gear ratio. Provided upon each wheel 2,4 are caliper brakes, as at 23,24, respectively.

Engaged upon front diagonal bar 6, proximate hub 8, is a bracket 25 comprised of a pair of matching components 26,26' being preferably stamped and each having aligned flanges 27,28 and 27',28', respectively, for projection upwardly and downwardly, respectively, of said bar 6. Provided in aligned flanges 27,27' are registering apertures 29,29', respectively, while said flanges 28,28' similarly incorporate registering apertures 30,30', respectively, accommodating elongated cap screws 31, 32, respectively; with each of the latter securely maintaining bracket 25 on bar 6 by means of washers w and nuts n, and with the major portions of the stems 33,34 of cap screws 31,32, respectively, extending beyond bracket component 26' in a direction toward the right hand side of bicycle A as viewed from the front of said bicycle or toward the side threof accommodating pedal crank 18; said screw stems being in axial parallel relationship as may best be seen in FIGS. 3 and 4. Screw stem 33 in its outer portion projects through aligned openings 35,36 formed in the opposed flanges or side walls 37,38 of a lever 39 of generally channel-shape having a web 40 extending between said walls 37,38 in their forward end portions. Encircling screw stem 33 between wall 37 of lever 39 and the adjacent nut n is a spacer 41 and at its outer extremity said screw stem mounts a snap ring 42 for preventing displacement of lever 39. Screw stem 34 is presented forwardly of web 40 of lever 39 and is provided with a pair of transverse openings 43,44 for extension therethrough of the lower ends of brake cables 45,46, respectively, which in their adjacent end extremities continue through aligned openings 47,48 formed in lever web 40 and having enlarged elements 49 provided on such extremities to securely maintain engagement of said cables 45,46 with lever 39. Each of said brake cables 45,46 are encased within the usual flexible sleeves 50,51, respectively, and are connected to front and rear caliper brakes 23,24, respectively, in the expected manner.

Extending transversely between the lower ends of walls 37, 38 of lever 39 and fixed at its ends therein is a shaft 52 on which is pivotally mounted the forward end of a latch arm or tension link 53; there being collars 54 disposed on said shaft 52 on either side of said latch arm 53 to maintain same centered with relation to the longitudinal axis of lever 39 and to direct same rearwardly for alignment with rollers 55,56 carried upon pins 57,58, respectively, mounted on sprocket wheel 20 for extension laterally therefrom in a direction toward the left hand side of bicycle A; said pins 57,58 being so positioned relative to each other for presenting the associated rollers 55,56 at an angle of 180° to each other. Said latch arm 53 is of such length as to be within the path of travel of rollwers 55,56 upon rotation of drive sprocket 20. Said latch arm 53 is contoured on its lower edge to present a forwardly opening, arcuated cam edge 59 formed on substantially a like radius as rollers 55,56 for potential engagement therewith throughout their upper rearward quadrant upon latching engagement, as described hereinbelow. The rearward end portion of the lower edge of latch arm 53 is rectilinear, as at 60, progressing from the lower end of cam edge 59. Engaged to said latch arm in its rearward end portion is the lower end of a control cable 61 which progresses upwardly in relative adjacency to rear diagonal bar 7 for connection to a hand lever 62 pivotally engaged at its rearward end, as at 63, upon a bracket 64 provided at the upper end of diagonal bar 7 beneath seat 11.

Figure 2:
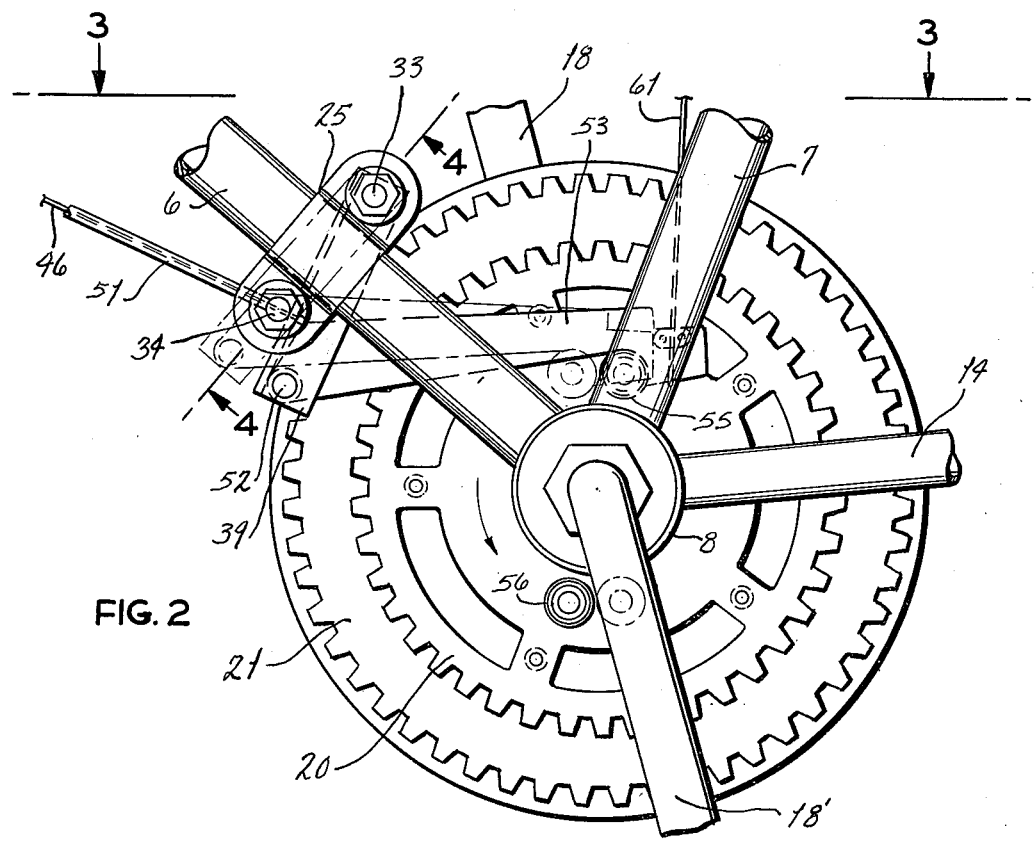
FIG. 2 is a fragmentary enlarged side view of the brake operating mechanism.

In view of the foregoing, it will be seen that with bicycle A traveling forwardly, with sprocket wheel 20 moving in a counterclockwise direction as indicated by an arrow in FIGS. 2 and 5, rollers 56 and 55 will successively strike the rectilinear edge 60 of latch arm 53 causing said latch arm to be rocked upwardly about shaft 53 and thus remove same from the path of travel of the striking roller so that there is no inhibition to the continued forward movement of bicycle A. However, when the rider back pedals, that is, causing sprocket 20 to travel in a clockwise direction, as viewed in FIGS. 2 and 5, the immediately forward roller 55 or 56, as the case may be, will be moved rearwardly and thus brought into engagement with cam edge 59 whereby further clockwise movement is impeded so that a braking action is initiated. As further back pedaling pressure is applied, latch arm 53 will be moved rearwardly through rocking of lever 39 about screw stem 33 causing an application of further tension upon brake cables 45,46 with the developement of a locking of wheels 2,4. The limited potential movment of latch arm 53 when engaged upon the particular roller 55,56 is indicated by the phantom and full lines in FIG. 2, with the former depicting the position at the inception of braking action and the latter showing the condition when full braking action is effected wherein wheels 2,4 are held against movement. Thus, the degree of rock of lever 39 between such positions demonstrates the braking range so that short of full wheel locking position, release of back pedaling pressure upon sprocket 20 will automatically effect a release of brakes 23,24 so that the rider may continue his travel. However, with latch arm 53 in full rearward or wheel-locking position, a downward force will have been applied upon control cable 61 causing lever 62 to be rocked downwardly at its forward end (as may best be seen in FIG. 1) so that releasing of latch arm 53 from the engaged roller 55,56 may be effected only by upward pulling upon lever 62 which will thus raise the rearward end of latch arm 53 and thereby bring about unlocking of wheels 2,4.

Figure 7:
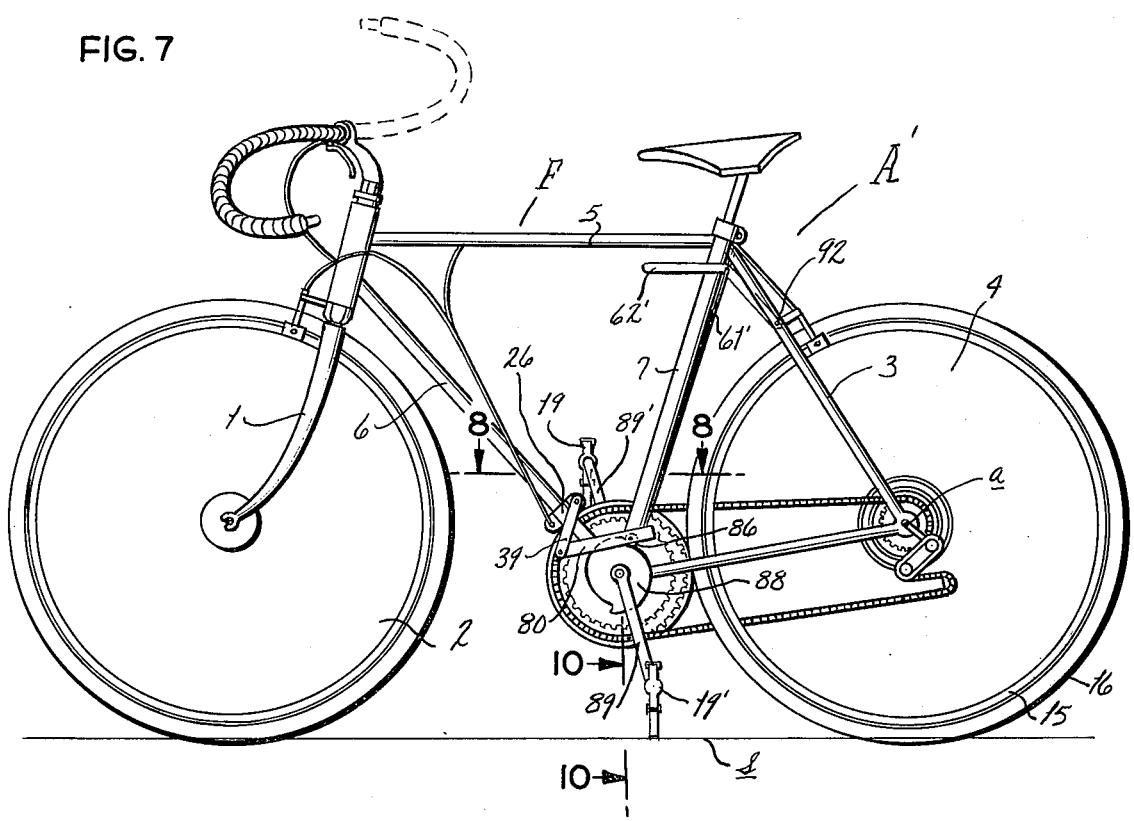
FIG. 7 is a side elevational view of a bicycle having mounted thereon another form of pedal actuated brake with coordinating support stand constructed in accordance with and embodying the present invention.
Figure 8:
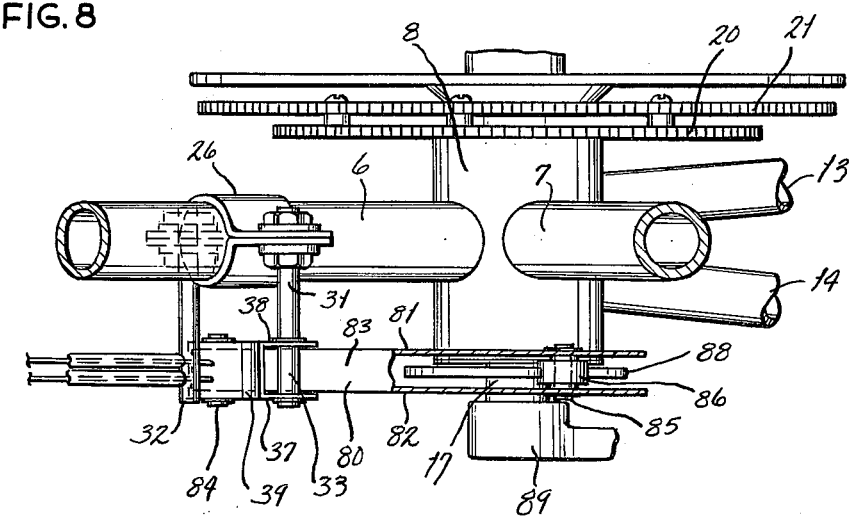
FIG. 8 is a top plan view, in partial section, taken on the line 8—8 of FIG. 7.

Pedals 19,19' of bicycle A are of like, fundamentally conventional construction so that only description of pedal 19' as shown in FIG. 6 will be undertaken. Pedal 19' comprises normally front and rearward, planar parallel tread strips 65,66, respectively, which at their opposite ends are engaged to outer and inner side or lateral plates 67,68, respectively, being in mutually planar parallel relationship and with the connection to tread strip 65,66 being in any suitable manner, such as by means of interlocking tabs or tongues, as at 69, and/or with one of said side plates being integrally formed with said tread strip 65,66. Each side plate 67,68 is centrally provided with the usual aligned, relatively enlarged openings (not shown) for receiving the appropriate housings, as at 70, for securing a tubular casing 71 extending therebetween and through which projects the crank arm c formed at the lower end of pedal crank 18'; with there being the usual ball bearings (not shown) accommodated within said housings 70. In its outer end portion tread strip 65 is customarily provided with an opening, as at 72, for receiving the threaded end 73 of an elongated support rod 74. Nuts 75 are secured upon said threaded portion 73 on opposite sides of strip 65 to effect a rigid and reliable securement between support rod 74 and pedal 19'. With reference to FIGS. 1 and 7, it will be seen that rod 74 is disposed within the plane of strip 65 but is bent immediately forwardly of threaded portion 73, as at 76, for extension in a direction laterally beyond the outer face of adjacent outer side plate 67 and on its outer end extremity mounts an enlarged support surface-engaging head 77. The length of rod 74 is such as to support bicycle A in a firm position of rest when in disuse wherein pedal 19' will be in generally vertical disposition as shown in the drawings. It will, of course, be observed that by mounting support rod 74 upon pedal 19', the latter, upon removal of the operator's foot, will be rocked about the pedal crank 18' so as to prevent the support rod downwardly, through the eccentricity of weight distribution of said pedal 19' by reasobn of the securement thereon of said support rod 74.

It is to be particularly observed that sprocket 20 is mounted upon shaft 17 in such manner as to relate roller 55 to pedal crank 18' so that when initial engagement is made between roller 55 and latch arm 53 upon back pedaling movement, said pedal crank 18' will extend downwardly and slightly rearwardly (see FIG. 1) so that upon further clockwise travel of roller 55 as in the direction indicated by the arrow in FIG. 1, pedal crank 18' will be brought into full vertical disposition. Thus, throughout the aforesaid braking range, pedal crank 18' is so disposed that if the operator removed his foot from pedal 19' the same, under influence of support rod 74, would rock so that said rod 74 was in position to immediately engage the support surface, as indicated at s, should the operator desire to dismount.

Understandably, pedal crank 18 is related similarly to roller 56 as pedal crank 18' is to roller 55 as described, so that regardless of which pedal 19 or 19' is located downwardly at the time of braking, the user may dismount to such side with the assurance that bicycle A will be supported upon one or the other of support rods 74.

Support rods 74 may obviously be mounted at any convenient location upon the respective pedals but are prefereably adapted for enegagement within an opening customarily provided in conventional pedals. Furthermore, since support rods 74 are within the plane of the engaged tread strips, the same will not cause any interference during normal cycling action. It is, of course, recognized that said support rods may be engaged to either of said tread strips 65,66 as the rocking action of the related pedal would be the same in either case, as well as in one end portion of outer side plate 67.

As indicated above, at the end of a parking period, brakes 23,24 are released by lifting hand lever 62 and with the upper pedal being positioned for facile mounting. However, if backward movement of the bicycle is desired for positioning of one pedal or the other for easy mounting, hand lever 62 will be retained in released position during such movement.

Figure 9:
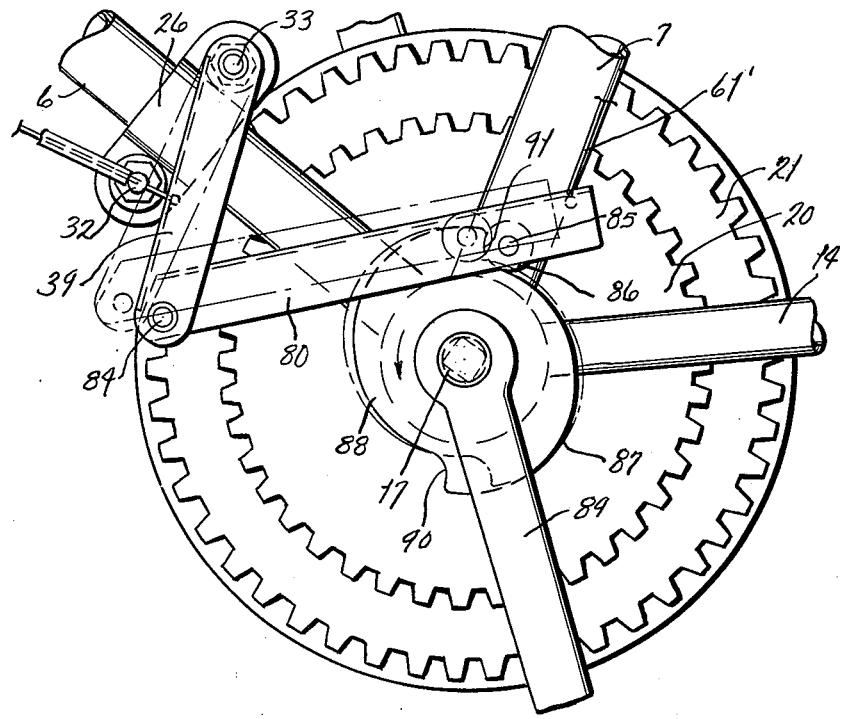
FIG. 9 is a fragmentary enlarged side view of the brake control mechanism illustrated in FIG. 7.

Referring now to FIGS. 7–10, inclusive, A' designates a bicycle which is fundamentally similar to bicycle A above described, but which incorporates a modified arrangement for effecting braking action. Components of bicycle A' which are of like construction as corresponding components of bicycle A will bear the same reference numerals. As may best be seen in FIG. 8, cap screws 31,32 are so related to bracket 26 as to extend laterally outwardly toward the left hand side of bicycle A', that is, away from sprocket wheels 20,21 rather than in the opposite direction as with bicycle A above described. Disposed within the lower end of lever 39 is the forward end of a latch arm 80 being of generally channel-shape, opening downwardly, and having side flanges 81,82 and a web 83 therebetween; a pivot pin 84 extends through registering apertures (not shown) in flanges 81,82 and 38,37, respectively, of said latch arm 80 and lever 39, whereby the said latch arm 80 is rockable about the axis of pin 84. In its rearward portion said latch arm 80 carries a shaft or pin 85 fixed at its ends within aligned openings in said flanges 81,82 for mounting a roller or cam follower 86, the bottom edge portion of which projects slightly beyond the lower edges of flanges 81,82 for engaging the periphery 87 of a disc cam 88 carried upon pedal shaft 17 spacedly laterally outwardly of the adjacent end of hub 8. On the outer extremity of shaft 17 there is engaged the upper end of a pedal crank. As shown in FIG. 9, shaft 17 in its portion outwardly of hub 8 is square in cross section, as is common with most foreign-made bicycles. Thus, cam disc 88 is provided with a square hub for appropriate mounting upon said shaft 17. The periphery 87 of disc cam 88 incorporates a pair of working edge portions 90,91 which are 180° apart and each being formed on a like arc having substantially the same radius as cam follower 86, for potential engagement with cam follower 86 in its normally lower forward quadrant. It will thus be seen that during forward travel of bicycle A' disc cam 88 will rotate in a counter-clockwise direction, as indicated by an arrow in FIG. 9, with cam follower 86 moving relatively along the periphery thereof without the development of inhibiting engagement therebetween. However, upon back pedaling operation of bicycle A', the working edge 90 or 91 most immediately forwardly of cam follower 86 will be brought into abuting relationship therewith for initiating braking action and upon the application of further back pedaling pressure latch arm 80 will be moved slightly rearwardly by reason of lever 39 pivoting about screw stem 33 whereby locking of wheels 2,4 is effected. Disengagement of latch arm 80 from disc cam 88 is effected by upward pulling upon a hand lever 62' connected to the rearward end of said latch arm 80 by a control cable 61'; said lever 62' being pivoted upon rear fork 3, as at 92.

Cam operating edge 91 bears the same relationship to pedal crank 89 as does roller 55 of bicycle A bear to pedal crank 18'; and with corresponding relationship between working edge 90 and the opposite pedal crank 89' so that support rods 74' carried upon pedals 19,19' will be disposed for operative relationship with respect to the particular support surface s.

Figure 10:
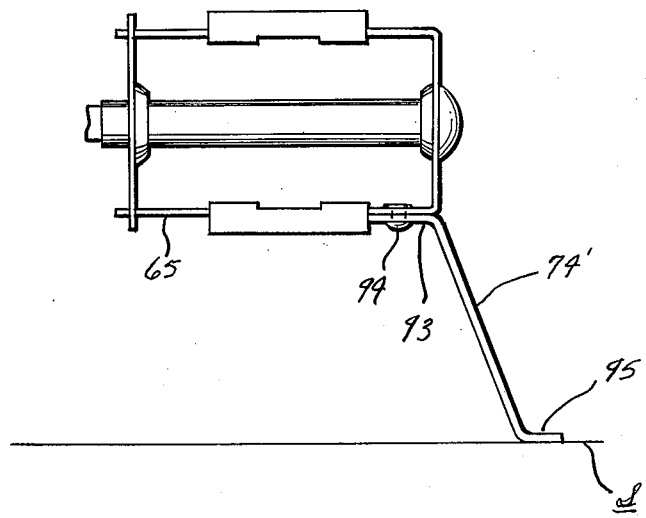
FIG. 10 is a front elevational view taken on the line 10—10 of FIG. 7.

With reference to FIG. 10 it is to be observed that support rod 74' may integrally incorporate a mounting flange 93 for flatwise disposition against the adjacent outer face portion of tread strip 65 and being engageable therewith by means of a rivet 94; there being a reversely turned flange 95 at the opposite or outer end of support rod 74' for flatwise disposition upon the support surface s. Thus, support rod 74' is merely exemplary of the myriad configurations possible for support rods.

Accordingly, the braking control arrangement mounted on bicycle A' is fundamentally of like character as that disposed upon bicycle A but differs in that the cam follower is carried upon the latch arm as distinguished from the cam follower being mounted upon a drive sprocket wheel and with expected reversal of the cooperating cams. However, the arrangements shown with respect to bicycles A and A' demonstrate the versatility of the present invention and its ready usefullness with bicycles of the various current makes.

Referring now to FIGS. 11, 12, 13, and 14, inclusive, A" designates a bicycle which is fundamentally similar to bicycles A and A' above described, but which incorporates a further modified arrangement for effecting pedal actuated braking action. Components of bicycle A" which are of like construction as corresponding components of bicycles A and A' will bear the same reference numerals. Affixed, as by welding, to the under surface of rear support bars 13,14, immediately proximate hub 8 is the bottom or horizontal leg 100 of an L-shaped bracket 101 having an upstanding, short vertical leg 102 disposed immediately laterally outwardly of support bar 13 and terminating immediately thereabove; said leg 102 in its upward, rearward portion being formed to provide a transversely extending ear 103 having a pair of vertically arranged openings 104, 105 for extension therethrough of front and rear brake cables 106,107, respectively,, which progress rearwardly for securement at their rear terminals upon a substantially registering ear 108 carried upon the rearward edge of a lever arm 109, said ear 108 being substantially planarwise perpendicular to the plane of said lever arm 109 which latter contains at its lower end an opening, as at 110, for alignment with an opening 111 through which extends a rivet 112 establishing a hinge axis whereby said lever arm 109 is rockable forwardly and rearwardly with respect to said bracket 101; said lever arm being disposed upon the side of leg 102 proximate sprockets 20,21 Lever arm 109 is of general kidney shape having an upper slightly rearwardly canted portion within which is presented an opening 113 for projection therethrough of a shoulder type rivet 114 for engagement within an aligned opening 115 provided at the rearward end of a push link 116 formed preferably of flat stock and having its forward portion being slightly offset laterally outwardly, as at 117. Said push link 116 is disposed on the side of lever arm 109 remote from sprockets 20,21 and thus in overlying relationship in its rearward portion to leg 102 of bracket 100. The rearward end edge of push link 116 is contoured to form a downwardly directed shoulder, as at 118, for limiting against a detent or stop 119 formed on the upper rearward edge of lever arm 109 upwardly of ear 108 for purposes presently appearing. On its upper forward end, push link 116 is provided with an ear 120 to which is engaged the lower end of a control cable 121 which progresses upwardly in relative adjacency to rear frame diagonal bar 7 for connection at its upper end in the central zone of a control lever 122; the latter being pivotally engaged at its lower, rearward end, as at 123, upon a bracket 124 fixed on the upper end of fork 3. Said control lever 122 comprises a forwardly presented handle 125 downwardly of the forward portion of bicycle seat 11 for convenience of manipulation.

The forward end edge of push link 116 has a concave recess, as at 126, being formed upon a radius for peripheral engagement with rollers 127,128 carried upon pins 129,130, respectively, mounted on sprocket wheel 20 for extension laterally therefrom in a direction toward the left hand side of bicycle A; said pins 129,130 being so positioned relative to each other for presenting the associated rollers 127,128 at an angle of 180° to each other.

Figure 13:
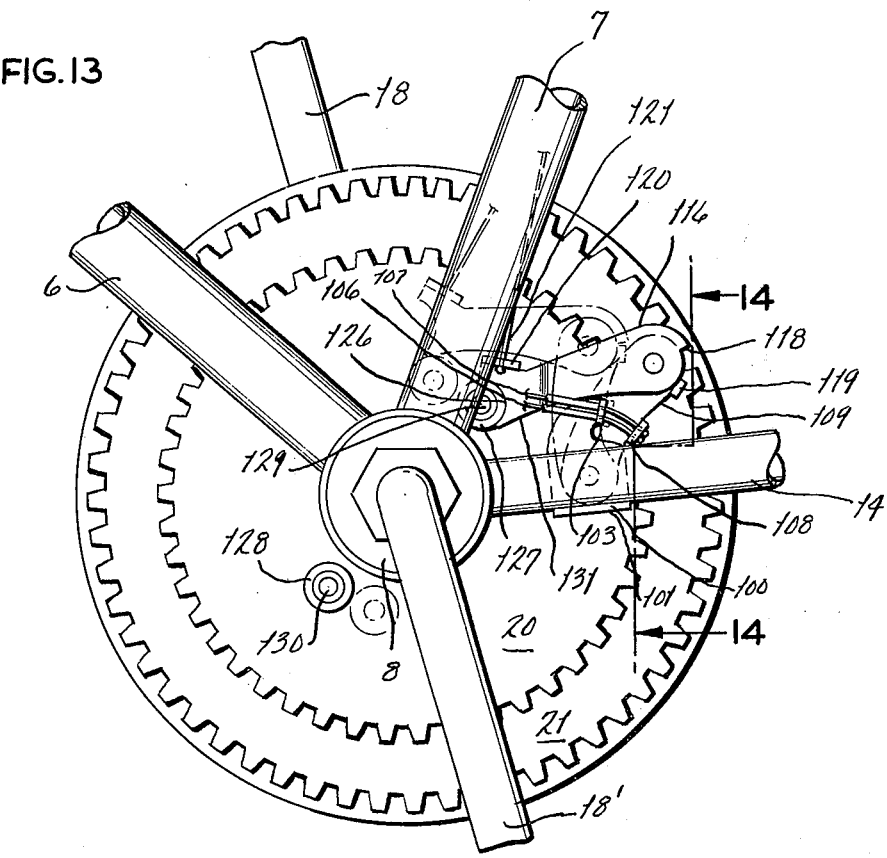
FIG. 13 is an enlarged side elevational view of the brake mechanism.
Figure 14:
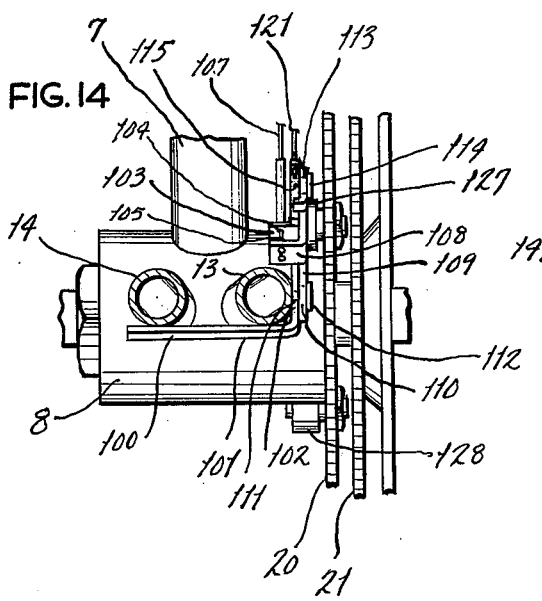
FIG. 14 is a vertical transverse sectional view taken on the line 14—14 of FIG. 13.

Push link 116 is of such length as to be within the path of travel of rollers 127,128 during rotation of sprocket wheel 20 and has a slightly concave lower edge, as at 131, so that when bicycle A'' is being operated in a forward direction, as indicated by the arrow in FIG. 13, rollers 127, 128 will sequentially strike against said lower edge of push link 116 and cause same to be deflected from the roller-path of movement as by rocking upwardly about the pivot axis established by rivet 114.

Thus, when the bicycle is being pedaled forwardly the rollers 127,128 move in a counterclockwise direction as viewed in FIG. 13 and cause push link 116 to be lifted from beneath to prevent same from being an obstacle. However, when the bicycle operator desires to apply the brakes, a back pedaling operation is effected thereby causing sprocket wheeel 20 to move in a clockwise direction, as view in FIG. 13, whereby the proximate roller 127,128, as the case may be, will be received within recess 126 of push link 116 and thereby exerts a rearward and slightly rocking force against link 116 causing shoulder 118 to abut stop 119 so that as backward pressure is applied by the operator, with the engagement being retained between the particular roller and push link 116, as shown in full lines in FIG. 13, a pivotal movement of lever 109 is effected about the pivot axis established by rivet 112 thus causing a pulling upon brake cables 106,107 for applying braking action upon wheels 2,4. Push link 116 is effectively locked by means of the engagement between same and lever 109 so that rotation of sprockets 20,21 is inhibited and with the associated brakes being firmly maintained in braking condition. Only by upward pulling upon cable 121 can the operator effect disengagement between push link 116 and the engaged roller 127 or 128, as the case may be, and thereby permit releasing of the brakes upon freeing of lever 109 from such locked condition. It may be noted that cable 107 which goes to the rear brakes has slightly more leverage, being the lower of the two cables so that it may cause the rear caliper brakes to operate slightly in advance of the front brakes.

As with bicycles A and A' above described, rollers 127, 128 are so related to pedal cranks 18, 18' that as soon as the wheels are locked or braked, the associated pedals 19, 19'are disposed so that the support rods, such as 74, will automatically drop into bicycle supporting condition upon removal of the operator's foot.

Figure 11:
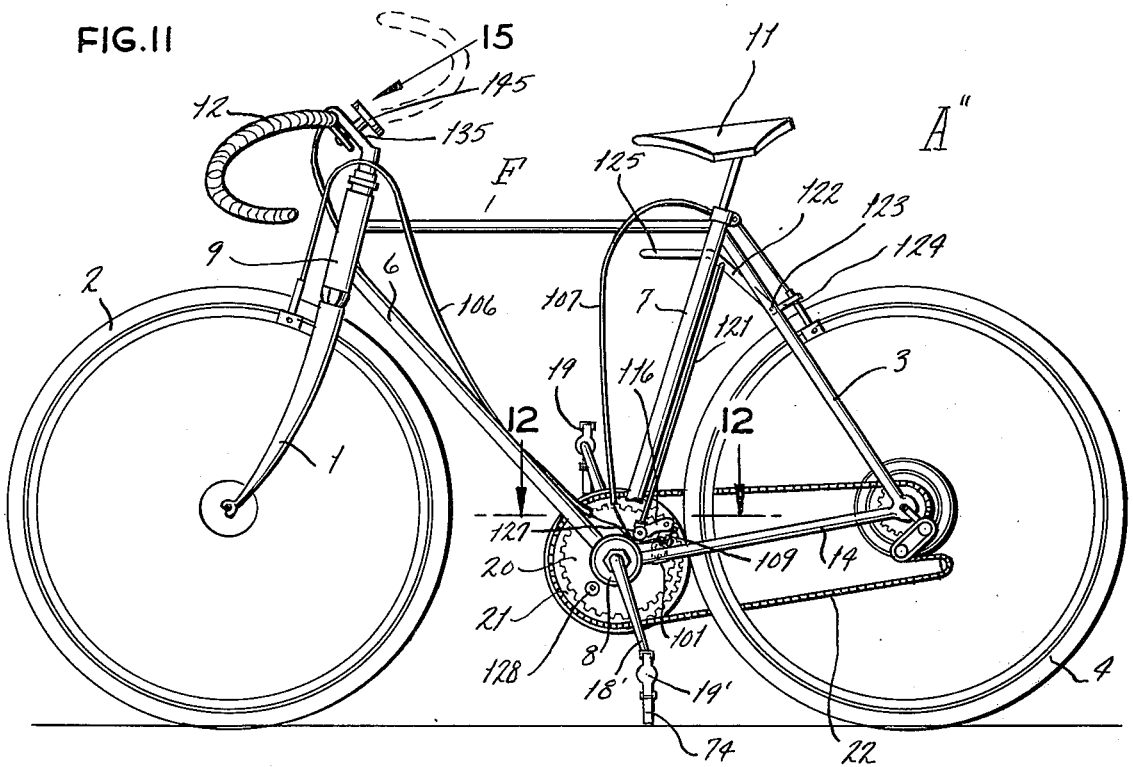
FIG. 11 is a side elevational view of a bicycle having mounted thereon a further form of pedal actuated brake with coordinating support stand constructed in accordance with and embodying the present invention.
Figure 12:
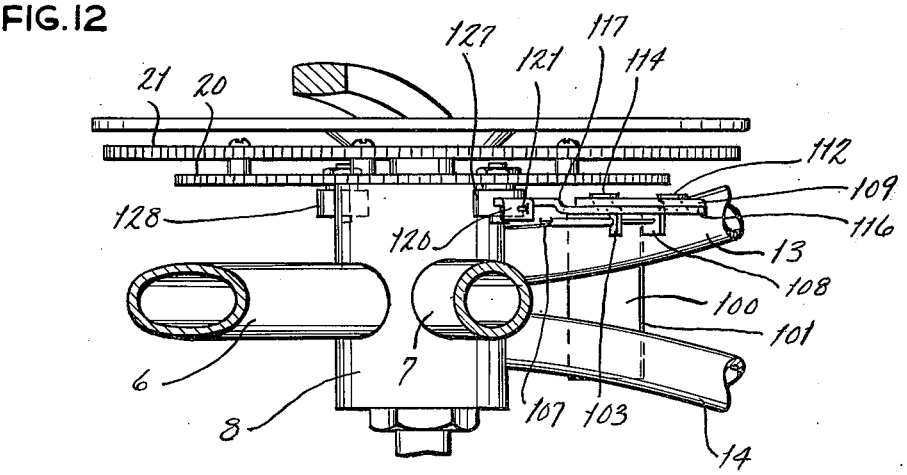
FIG. 12 is a horizontal transverse sectional view taken on the line 12—12 of FIG. 11.
Figure 15:
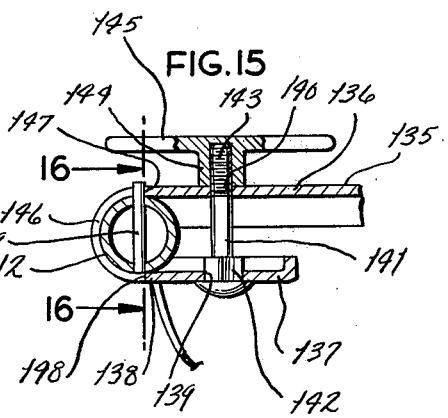
FIG. 15 is a transverse sectional view taken in the zone indicated at 15 in FIG. 11.
Figure 16:
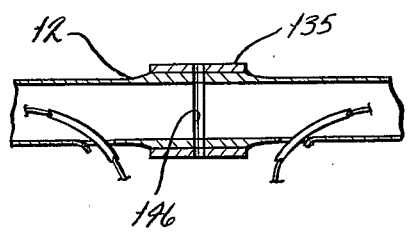
FIG. 16 is a vertical transverse sectional view taken on the line 16—16 of FIG. 15.

With reference to FIGS. 11, 15 and 16, it will be seen that at the upper end of frame post 9 is a forwardly and upwardly extending stem 135 which at its forward end comprises upper and lower vertically spaced-apart arm portions 136,137 which latter at their forward ends merge to define a receptacle 138 for the central portion of handle bar 12. Said lower arm portion 137 is relatively short and is free at its rearward end. Formed in said arm portions 136,137 are aligned openings 139,140 for accommodating a bolt 141, the lower end having a square neck 142 for non-rotatable reception within the complementarily formed opening 139 and with the upper end being threaded as at 143 for extension upwardly of arm 136 to engage the internal threads of a nut 144 provided with a hand wheel 145 for facilitating loosening and tightening of said bolt 141 for controlling the clamping of said handle bar 12. It will be noted that in its forward portion, disposed about handle bar 12 said receptacle 138 is provided with a slot 146 of approximately 180° in extent for forming upper and lower stops 147,148 against which a pin 149 carried in handle bar 12 and extending at one end radially therebeyond may abut for limiting the degree of rock of handle bar 12. Thus, mere loosening of nut 144 will permit the user to readily shift handle bar 12 through an angle of 180°, that is, customarily between racing position (wherein the handles are normally downwardly) and touring position (wherein the handles are normally upwardly). After such is positioned, nut 144 is readily tightened and handle bar 12 is thus secure in selected disposition. The transverse extent of slot 146 is such that unauthorized movement of handle bar 12 longitudinally is prevented.

Referring now to FIGS. 17, 18, and 19, another form of pedal construction useful with bicycles A, A' and A'' hereinabove described is illustrated and which is fundamentally of the same character as foot pedal 19' above described and shown in FIG. 6 so that components thereof which correspond to the last mentioned pedal will carry like reference numerals for purposes of simplifying the description.

Outer tread strip 65 is provided with an opening 72' adjacent inner side plate 68 for cooperating with opening 72' to receive short bolts 173',173, respectively, for securement to said last mentioned strip of the lower mounting flange 174 of a conventional toe clip 175 which in its upper portion characteristically is directed normally rearwardly for disposition adjacent the upper portion of the operator's foot. At its rearward uper end said toe clip 175 is provided with a loop 176 for threading therethrough of the usual adjustable strap 177 which in its normally lower portion progresses through aligned openings 178 in the rearward portion of side plates 67,68. Thus, toe clip 175 will project forwardly of a front tread strip 65.

Secured upon normally rearward tread strip 66 as by rivets 179, 179' is the mounting flange 180 of a plate 181, the plane of which is normal to mounting flange 180 and which projects rearwardly from said tread strip 66. Said plate 181 along its inner margin, as at 182, is substantially aligned with the inner side plate 68, while on its lateral outer margin said plate inclines laterally, outwardly, and rearwardly from outer side plate 67, as at 183. The rearward end margin 184 of plate 181 is parallel to tread plate 66 substantially throughout its extent with the exception that in its outer end portion projects slightly rearwardly, as at 185, to form the base of a support stand-forming flange 186, the plane of which is normal to that of plate 181 and which flange will be in generally upstanding relationship to said plate 181 when pedal 19' is in operating condition as illustrated in FIG. 19. As may best be seen in FIG. 17, said foot, with counterweight 220 being presented downwardly so that end edge section 215 is disposed for engaging the support surface and thereby serving as a support stand. The associated toe clip 207 will be automatically presented in downwardly opening condition so that entry there-into by the operator's foot upon resumption of bicycle operation may be comfortably and reliably effected.

In the event the support stand feature of pedal P may not be desired, counterweight 220 may be removed by loosening of screw 221 and support member 188 can be so related to mounting arm 202 that the portion extending rearwardly from the axis of said arm 202 will counterbalance the portion projecting forwardly thereof with the toe clip attached so that upon removal of the operator's foot, pedal P will automatically maintain a horizontal disposition and in such condition pedal P could be used as a substitute for standard pedals and standard toe clips which latter are consistently in upside down state when in disuse.

Referring now to FIGS. 24–29, inclusive, a still further form of pedal, indicated generally P', is shown which is useful with bicycles A, A', A'' above described, as well as bicycles generally. Pedal P' is also of the low, or underslung character, and elements thereof corresponding to elements of pedal P above described will bear like reference numerals. Ball bearing assembly 196 is press fitted within an opening 222 provided in a block 223 of trapezoidal configuration. Mounted upon block 223 is a foot supporting assembly, indicated generally 224, being of stirrup character, and comprised of a pair of front and rear cooperating loop-forming elements 225, 226 formed, as by stamping, from sheet metal. Each of said loop-forming elements 225,226 comprises spaced-apart inner or outer legs 227,228 which at their upper ends, merge into a top component 229, and at their lower ends are interconnected by a base component 230. Throughout the major portion of their extent, each loop-forming element 225, 226 is angle-shaped in cross section, having a continuous facing flange 231 and an edge flange 232. The said loop-forming elements 225,226 are canted toward each other to present the confronting portions of their top components 229 in abutting relationship and thereby being in diverging relationship at their opposite ends so that their respective base components 230 are spaced apart. The edge flanges 232 or inner legs 227 of said elements 225,226 abut against the inwardly directed face of block 223 and are secured thereto, as by screws 232, which thus constitute the means of attachment of foot support assembly 224 to mounting block 223. It is to be observed that the facing flange portion of each base component 230 is serrated, as at 234, throughout its upper edge, which flanges jointly serve as a support for the operator's foot being functionally comparable to the tread strips of conventional pedals such as those shown at 19,19' hereinabove. As will be observed in FIG. 29, the facing flange portions of each base component 230 taper downwardly and inwardly along their lower portion, as at 235, thereby providing maximum strength in the zone merging into inner side leg 227 and providing maximum ground clearance at their outer or opposite ends in the event of lateral tilting of the bicycle during operation.

Also with reference being made to FIG. 29, it will be observed that foot support serrated edges 234 are located spacedly downwardly of the axis x of pedal crank arm 189 so as to endow pedal P' with the aforestated low, or underslung character.

Fixed to the facing flange portion 231 of base component 230 of front loop-forming element 225 by customary means is the lower end of a toe clip 236 of the usual character and with the upper end of the latter extending beneath the zone of contiguity of the top components 225,226 loop-forming elements 225,226 and having the usual loop 237 for threading therethrough of a length of strap 238 which extends transversely of pedal P' in substantial conformity to the configuration of the upper portion of foot supporting assembly 224. Strap 238 at its inner end is fixed as by a rivet 239 to a companion edge flange 240 provided on rear loop-forming element 226 and extending across top component 229 thereof and throughout the length of side leg 228 thereof. The other or outer end of strap 238 is fixed as by a rivet 241 upon an arm 242 carried upon a nut 243 which latter is engaged upon an adjusting screw 244 disposed within side leg 228 of rear loop forming element 226. Said screw 244 projects at its upper end through an opening 245 formed in the edge flange 232 of the adjacent portion of the associated top component 229 and having an enlarged knurled head 246 in its projecting portion for purposes of manipulation. Said screw 244 at its lower end is suitably engaged as within the edge flange 232 of the related base component 230 and the bottom flange 247 of an arm 248 (to be described presently) whereby said screw 244 is inhibited against movement longitudinally but permitted to rotate whereby nut 243 may be caused to travel relatively therealong. Said nut 243, as may best be seen in FIG. 26, is received snugly within facing flange 231, side flange 232 and cooperating flange 240 within side leg 228 of loop-forming element 226 so as to be restrained against rotation whereby upon turning of screw 244 said nut 243 will travel longitudinally of screw 244 and carry with it the attached end of strap 238 to permit of snug disposition of the same upon the user's foot.

Arm 248 is of angle shape having an outer side flange 249 planarwise normal to bottom flange 247 and being secured to the lower end portions of edge flanges 232 of outer side legs 228 of front and rear loop-forming elements 225,226 as by screws 250. Said arm 248 extends to a point spacedly rearwardly of foot supporting assembly 224 and at its end extremity mounts, as by a screw 251, a weighted support stand 252 of elongated, block-like form, the longitudinal axis of which is perpendicular to the longitudinal axis of arm 248. It will be observed that in usage, said stand 252 will be located laterally outwardly of the operator's foot so as to provide no interference therewith.

When the operator removes his foot from pedal P', the said stand 252 will so counterweight pedal P' as to cause same to swing into the condition shown in FIG. 25 wherein said stand will engage the support surface, presenting toe clip 236 in downwardly opening condition. Thus, pedal P' provides a sturdy, yet relatively lightweight, pedal which is of the aforesaid low, or under-slung character, having a support stand for automatically disposing the pedal in bicycle supporting condition when in disuse, as well as providing an enclosed, stirrup-like arrangement for reliable reception of the operator's foot and thereby inhibiting accidental displacement during usage. Ball bearing asembly 196 is protected on its outwardly directed side by a dust cover 253 constituted of a flat disc fabricated as of plastic and having a central opening, as at 254, for engaging the rim 255 formed at the outer end of screw head portion 194.

Referring now to FIGS. 30-34, inclusive, a still further form of pedal, indicated P'', is illustrated which, as will be more fully developed hereinbelow, is adapted for general or standard usage for replacing the usual toe clip equipped pedal, as well as being adapted for use with bicycles A, A', A'' hereinabove described. Pedal P'', like pedals P and P' above described, is of the under-slung type, providing a relatively low center of gravity, and with its foot supporting portion relating to the axis $x$ and line $y$ as above described in conjunction with said aforementioned pedals P and P'. Elements of pedal P'' which correspond to elements of pedal P and/or P' above described will, for purposes of brevity, bear like reference numerals. Ball bearing assembly 196 is press fitted within an opening 260 provided within a mounting block 261, with there being dust covers or shields 262,263 provided on the outer and inner faces of ball bearing assembly 196 within opening 260; the same being of disc-like character and each being centrally apertured for respectively accommodating screw head rim 255 and outer race 195. Mounting plate 261, downwardly of opening 260 and forwardly and rearwardly thereof, mounts laterally projecting, axially parallel forward and rearward support arms 264,265, respectively. Said arms 264,265 are each of angle configuration in cross section, each having a vertical flange 266 and a bottom flange 267. Each of said arms 264,265 at their inner ends are pressed into openings 268,269, respectively, formed in said mounting block 261, which openings are of complementary contour to the received portions of said arms 264,265 and thus being of general L-shape. For maintaining said arms 264,265 rigidly within mounting block 261, screws 270 are provided for reception within aligned openings in mounting block 261 and the received portions of the vertical flange 266 of said arms 264,265.

The lower flanges 267 of each arm 264,265 are upwardly and outwardly inclined so that the associated vertical flange 266 is of maximum height at its inner end and of limited height at its outer end, but with its upper edge, as at 271, being horizontal and preferably serrated, corrugated, or the like, as at 272, to provide a foot-supporting tread. Thus, the taper of arms 264,265, while assuring of proper foot support for the operator, attains the same benefits as obtained by the taper in base components 230 of pedal P' and the taper of arm 202 in pedal P. It is to be particularly noted that arms 264,265 are so disposed with relation to mounting block 261 as to present the treads as provided at 272 downwardly of crank arm axis $x$ to give the under-slung character to pedal P''. Said arms 264,265, at their outer ends, are engaged as by rivets 273 to the base flange 274 of an angle shaped connector 275 having a vertical or upstanding outer flange 276. Thus, connector 275 integrates arms 264,265 in their outer portions into a stable foot supporting element and by its vertical flange 276 provides a point of attachment for the lower, outer end of a toe clip strap component 277, as by a rivet 278. Said connector 275 terminates at its rearward end substantially in alignment with the rearward edge 279 of mounting block 261. The strap component 277 cooperates with a companion strap component 280 which at its inner lower end is affixed to mounting block 261 as by a screw 281. The opposite or free ends of strap components 277,280 are adapted for inner engagement by the customary buckle 282. Strap component 280 is threaded through loop 208 of toe clip 207, the lower end of which is affixed to flange 266 of forward arm 264 as by rivets at 283,283'.

With reference to FIG. 31, it will be seen that mounting block 261 is of non-symmetrical contour having its major area rearwardly of a vertical plane passing through the axis of rotation of crank arm 189 so that it is eccentrically weighted with respect thereto as evidence by zones 284,285 which latter are of such extent as to offset the weight of toe clip 207, that is to counterbalance same so that the tendency of toe clip 207 to rock pedal P'' downwardly and rearwardly is countered by the tendency of block 261 through its particular configuration to rock pedal P'' downwardly and forwardly. Thus, mounting block 261 is uniquely designed to cause pedal P'' to remain in a horizontal, fully balanced condition even when in disuse and thereby obviate the need to associate same with the bicycle brakes or with a support stand since when the rider dismounts pedal P'' will resist rocking and thereby remain in position for facilitating reception of the operator's foot upon resumption of use of the associated bicycle. Accordingly, pedal P'' may replace standard pedals equipped with toe clips.

As shown in FIGS. 33 and 34, pedal P'' may, if desired, be adapted for use with pedal brakes as above described in conjunction with bicycles A,A' and A'', by affixation to the vertical flange 276 of connector 275 in its rearward portion, the forward end of a rearwardly projecting elongated arm 286 which at its rearward and extremity carries a light weight 287 which is preferably axially normal to arm 286 and secured thereto by a screw 288. Said weight 287 is in actuality a support stand so that when the operator's foot is removed from pedal P'' the same will rock downwardly and forwardly from its rearward portion, disposing toe clip 207 in downwardly opening disposition (see FIG. 33), and with pedal P'' being thus stabilized upon the support surface by said weight or stand 287. In view of the normally balanced character of pedal P'', the addition of arm 286 or weight or stand 287, provides the requisite torque so that said pedal P'' will automatically assume the position shown in FIG. 33 when in disuse. Pedal P'' as so modified by said arm 286 or weight or stand 287 adapts same for utilization with the pedal brake arrangement described in connection with bicycles A,A', and A'' above. It must be remembered that in addition to the foregoing features pedal P'' is of the under-slung character and, hence, provides the associated bicycle with the above discussed benefits of a pedal of such type.

Figure 35:
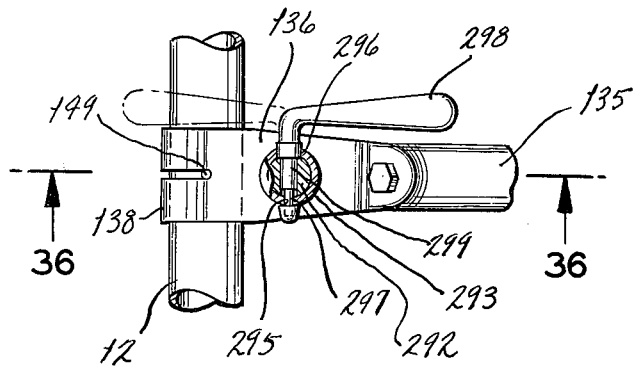
FIG. 35 is a fragmentary top plan view in partial section taken substantially in the zone indicated at 15 in FIG. 11, but illustrating a further form of handle bar control arrangement.
Figure 36:
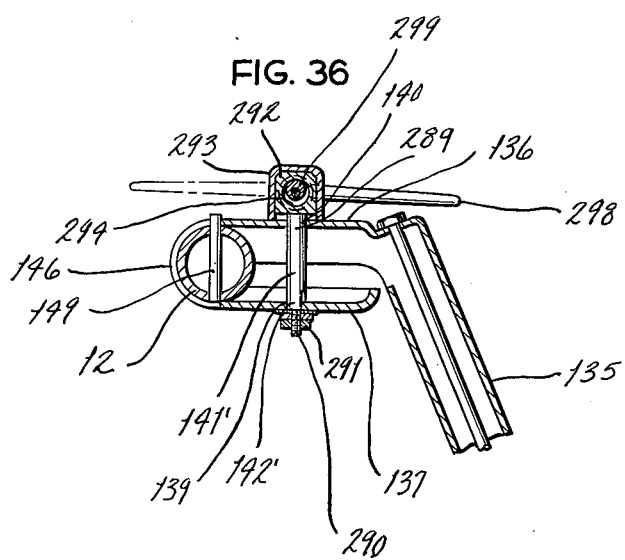
FIG. 36 is a vertical transverse sectional view taken on the line 36—36 of FIG. 35.

Referring now to FIGS. 35 and 36 another arrangement is illustrated for permitting rocking of handle bar 12 about its axis for disposition in either racing position (wherein the handles are located downwardly) or touring position (wherein the handles are extending upwardly). To simplify description, components corresponding to those hereinabove described and set forth in FIGS. 15 and 16 will bear like reference numerals. In the present arrangement, bolt 141' is of square cross-section at its lower end, as at 142', so as to prevent rotation within opening 139, and at its upper end, as at 289, as projecting through opening 140, is of smooth stem character being devoid of external threads. At its lower extremity, downwardly of arm portion 137, bolt 141' is of reduced cross-section and is externally threaded, as at 290, for accepting adjustment and retaining nuts 291.

On its upper end, bolt 141' carries an enlarged head 292 which is received within a casing 293 disposed upon the upper surface of upper arm portion 136. Said casing 293 is of slightly greater height than bolt head 292 so as to allow for relative vertical movement of the same therein for purposes presently appearing. Bolt head 292 is provided with a relatively enlarged transverse bore 294 which is aligned with bearing-forming openings 295,296 in the opposed walls of casing 293 for journalling of a shaft-forming component 297 provided in crank forming relationship to a control arm 298 presented exteriorly of housing 293, and being thus axially perpendicular thereto. Provided on shaft 297 is an eccentric 299. With reference being now made to FIG. 36, it will be seen that with control arm 298 in rearwardly extending downward position, said eccentric 299 is disposed for engaging the upper surface of aperture 294 and thus effecting an upward pulling upon bolt 141' for causing same to draw stem arms 137,136 toward each other and causing a clamping action about the received portion of handle bar 12. In this condition, handle bar 12 is retained securely in one of its positions of use, as aforesaid. By rocking control arm 298 upwardly, forwardly and, thence, downwardly into the position shown in phantom lines in FIG. 36, shaft 297 is rotated for causing eccentric 299 to move downwardly and thereby engage the lower portion of bore 294 causing bolt 141' to move axially downwardly and bring about a limited parting of arm portions 136,137 to allow the user to rock handle bar 12 into the other position of use. When so positioned, the user then effects an upward, rearward, and thence downward swinging of control arm 298 to clampingly lock arm portions 136,137 about the received portion of handle bar 12 to retain same in such other selected condition of use. Accordingly, the arrangement shown in FIGS. 35 and 36 obviates the utilization of the nut shown in FIG. 15 and provides a secure means for locking and unlocking stem portions 136,137 to facilitate rocking of handle bars 12 as desired, and for maintaining same in selected condition of use.

With respect to pedals P,P', and P'' it is to be observed that the same have been described as being mounted upon an internally threaded, relatively short crank arm 189. However, it is to be recognized that the cooperating head screws 193 could be just as easily secured within the threaded opening customarily found at the lower end of the conventional pedal crank as shown at 190 in the drawings. In this last context, there would be no necessity of providing a pedal crank arm.

Also, it is to be further observed that the quick release system shown in FIGS. 35 and 36 for permitting rocking of handle bar 12 would be useful with the shift lever arrangement shown in FIG. 7 wherein the said levers are illustrated at the ends of the handle bars and as set forth in co-pending patent Ser. No. 513,837, filed Oct. 10, 1974.

I claim:

1. For use with a bicycle having a frame, front and rear wheels supported on said frame, a pedal crank assembly with a main shaft and pedal cranks, and front and rear wheel caliper brakes, a brake control assembly comprising an elongated latch link disposed proximate said main shaft and having forward and rearward end portions, a lever arm having opposed ends, said lever arm being swingably mounted at one of its ends on said frame, said lever arm at its other end being pivotally engaged to the forward end portion of said latch link whereby the latter is permitted limited movement in a direction generally mounted of said bicycle by virtue of the swingable mounting of said lever arm, means connecting said front and rear brakes to said lever arm between its ends, means urging said lever arm forwardly from its swingable mounting when said brakes are in non-braking condition, a cam provided on said latch link in its rearward portion, cam support means mounted on said main shaft for rotation thereabout, at least one cam follower mounted on said cam support means for movement therewith, said cam and cam follower being unengaged during forward pedaling of said bicycle, said cam and said cam follower being engageable upon back pedaling of said bicycle whereby said latch link is caused to move in said generally rearward direction causing tension to be placed upon said brake connecting means thereby effecting braking action, and means engaged to said latch link for disengaging said cam and cam follower to release the bicycle from braked condition.

2. The brake control assembly as defined in claim 1 and further characterized by said lever arm opposed ends being generally upper and lower ends, said lever arm lower end being engaged to said latch link and said lever arm upper end being mounted on said frame.

3. The brake control assembly as defined in claim 2 and further characterized by said lever lower end being engaged to the forward end portion of said latch link.

4. The brake control assembly as defined in claim 3 and further characterized by said latch link having upper and lower edges, said cam being a cam-defining edge portion provided on said latch link lower edge.

5. The brake control assembly as defined in claim 4 and further characterized by said cam-defining edge portion being formed upon a radius, and said cam follower being at least one roller formed upon a radius complementary to that of said cam-defining edge for engagement therewith.

6. The brake control assembly as defined in claim 5 and further characterized by said at least one cam follower being first and second rollers and being spaced apart through an angle of 180° with respect to the path of rotation about said main shaft.

7. The brake control assembly as defined in claim 3 and further characterized by a cam roller carried upon said latch link in its rearward end portion, said at least one cam follower being an edge cam.

8. The brake control assembly as defined in claim 7 and further characterized by said at least one cam follower being first and second edge cams spaced apart through an angle of 180° with respect to said main shaft.

9. The brake control assembly as defined in claim 1 and further characterized by said lever opposed ends being upper and lower ends, said lever upper end being engaged to one end portion of said latch link and the lower end of said lever being mounted on said frame.

10. The brake control assembly as defined in claim 9 and further characterized by said lever upper end being engaged to the rearward end of said latch link.

11. The brake control assembly as defined in claim 9 and further characterized by said cam being a cam-defining edge on the forward end of said latch link.

12. The brake control assembly as defined in claim 11 and further characterized by said cam follower being at least one roller engageable with said cam-defining edge.

13. The brake contol assembly as defined in claim 12 and further characterized by said at least one cam follower being first and second cam rollers spaced apart through an angle of 180° with respect to the main shaft.

14. The brake control assembly as defined in claim 11 and further characterized by said cam support means being a drive sprocket mounted upon said main shaft and said cam follower being carried upon said drive sprocket.

15. The brake control assembly as defined in claim 14 and further characterized by said cam follower being first and second cam followers carried upon said drive sprocket and spaced apart through an angle of 180° whereby the relatively more proximate of said cam followers engages the said cam-defining edge of the latch link upon bicycle back pedaling.

16. The brake control assembly as defined in claim 1 and further characterized by said pedal cranks being in axially parallel relationship and extending in opposite directions from said main shaft, said at least one cam follower being first and second cam followers respectively disposed to said pedal cranks so that upon engagement of said cam and said cam follower as a result of back pedaling operation, one of said pedal cranks will be disposed in substantially vertically downwardly extending position, there being a pedal rotatably engaged upon the shaft remote ends of each of said pedal cranks and a bicycle support fixed on said pedals for support surface engagement upon downward extension of said one of said pedal cranks upon cam engagement.

17. The brake control assembly as defined in claim 16 and further characterized by said bicycle support comprising an elongated member fixed on the associated pedal and extending normally endwise thereof as determined by the operating position of said pedal, said bicycle support creating a torque arm so that upon removal of the operator's foot said pedal will swing about its axis to present said bicycle support in downward disposition.

18. A brake control assembly as defined in claim 16 and further characterized by said pedal cranks being disposed at predetermined angles with respect to said first and second cam followers.

19. A brake control assembly as defined in claim 18 and further characterized wherein said angles are of different extent with the greater angle being between the pedal crank and the related cam follower when the latter is engaged with the said cam element.

20. The brake control assembly as defined in claim 1 and further characterized by said pedal cranks being in axially parallel relationship and extending in opposite directions from said main shaft, said cam support means being a disc cam mounted upon said main shaft for rotation therewith, said at least one cam follwer being first and second edge portions provided on said disc cam and being disposed at predetermined angles with respect to the said first and second pedal cranks whereby upon engagement of one of said disc cam edge portions and said cam as a result of back pedaling one of said pedal cranks will be in downwardly extending position, a pedal carried upon each pedal crank for rotation about the axis of the pedal at the shaft remote end of the related pedal crank, and a bicycle support fixedly carried on each pedal for engaging the support surface upon downward extension of said one of said pedal cranks.

21. The brake control assembly as defined in claim 20 and further characterized by said angles between said first and second cam operating edge portions and said pedal cranks being unequal.

22. The brake control assembly as defined in claim 17 and further characterized by said bicycle support comprising an elongated member fixed on the related pedal and extending normally endwise thereof when said pedal is in operative position, said bicycle support creating a torque arm so that upon removal of the operator's foot the associated pedal will swing about its axis to present said bicycle support in downward disposition.

23. The brake control assembly as defined in claim 1 and further characterized by said means engaged to said link for disengaging said cam and cam follower being a cable, and means connectng a link-remote portion of said cable with said bicycle frame.

24. The brake control assembly as defined in claim 23 and further characterized by said cable having a lower end and and upper end, said cable lower end being engaged to said link, a control lever, means swingably mounting said control lever upon said bicycle frame and said cable being engaged in its upper end portion to said control lever.

* * * * *

UNITED STATES PATENT OFFICE
CERTIFICATE OF CORRECTION

Patent No. 4,030,774            Dated June 21, 1977

Inventor(s) Edwin E. Foster

It is certified that error appears in the above-identified patent and that said Letters Patent are hereby corrected as shown below:

Claim 1, Column 18, line 4, "mounted" should be ---rearwardly---;
Claim 13, Column 19, line 3, "contol" should be ---control---;
Claim 20, Column 20, line 9, "follwer" should be ---follower---;
Claim 23, Column 20, line 38, "connectng" should be ---connecting---; and
Claim 24, Column 20, line 42, "and" second occurrence, to read ---an---.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*